United States Patent [19]

Holmes

[11] 4,273,353
[45] Jun. 16, 1981

[54] ARTICULATOR FOR INTERCONNECTING FRONT AND REAR VEHICLE CHASSIS PORTIONS

[76] Inventor: John Holmes, 3380 Francis Rd., Richmond, British Columbia, Canada

[21] Appl. No.: 27,528

[22] Filed: Apr. 5, 1979

[51] Int. Cl.³ .............................................. B60D 1/00
[52] U.S. Cl. .................................... 280/483; 280/492
[58] Field of Search .............. 280/492, 493, 483, 488, 280/489; 180/235, 237

[56] References Cited

U.S. PATENT DOCUMENTS

| | | | |
|---|---|---|---|
| 2,837,349 | 2/1958 | Hawk | 280/492 |
| 3,623,567 | 11/1971 | McKenzie | 280/492 X |

FOREIGN PATENT DOCUMENTS 604394 10/1934 Fed. Rep. of Germany ........... 280/492
1092314 11/1960 Fed. Rep. of Germany ........... 280/483

Primary Examiner—John A. Pekar
Attorney, Agent, or Firm—Smyth, Pavitt, Siegemund & Martella

[57] ABSTRACT

An articulator for interconnecting front and rear chassis portions of a vehicle including a horizontal coupling assembly permitting relative pivoting of the front and rear portions of the vehicle about a generally horizontal axis. The horizontal axis passes longitudinally through the center of a pair of cylindrical mounting sleeves. A pair of insert enclosures each extend about respective cylindrical mounting sleeves and are concentric therewith. The mounting sleeves are connected to one of the vehicle portions while the insert enclosures are connected to a frame member which, in turn, is connected to another of the vehicle portions. There is a resilient insert fitted between the cylindrical mounting sleeve and the pair of insert enclosures.

16 Claims, 3 Drawing Figures

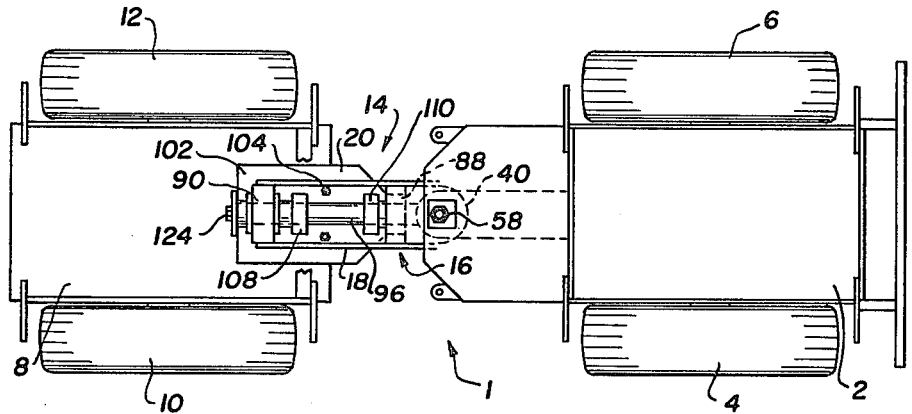
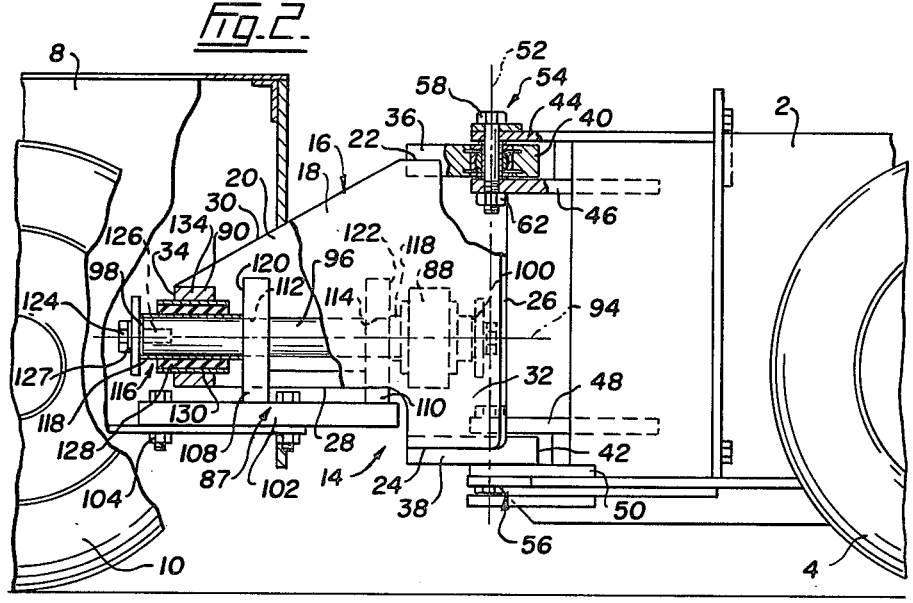
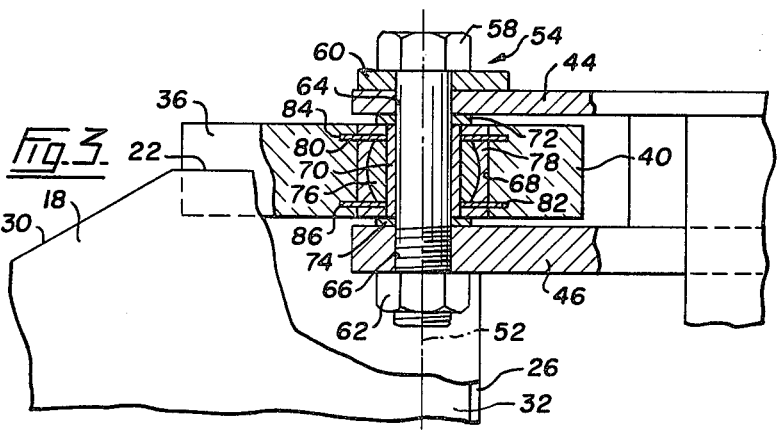

ARTICULATOR FOR INTERCONNECTING FRONT AND REAR VEHICLE CHASSIS PORTIONS

BACKGROUND OF THE INVENTION

This invention relates to an articulator for interconnecting front and rear wheeled portions of a vehicle.

Articulators for articulated vehicles are found, for example, in U.S. Pat. No. 3,912,300 to Bryan which includes a pair of vertically spaced spherical bearings for rotation about a vertical axis and includes elastomeric bushings which permit limited rotation about a horizontal axis.

U.S. Pat. No. 2,837,349 to Hawk discloses a universal hitch construction for an articulated vehicle. The hitch includes a horizontal hitch pin permitting rotation about a horizontal axis and a King pin member providing for rotation about a vertical axis. U.S. Pat. No. 3,348,888, also to Hawk, discloses a similar type of hitch.

U.S. Pat. No. 3,411,809 to Kampert discloses the use of vertically spaced spherical bearings for rotation about a pivot axis.

Other United States Patents which disclose coupling mechanisms which allow for movement around both horizontal and vertical axes include U.S. Pat. Nos. 3,525,539 to Illar, 3,240,284 to Finneman and 2,187,970 to Greer.

SUMMARY OF THE INVENTION

An articulator for interconnecting front and rear chassis portions of the vehicle comprises a frame a pair of spaced apart mounting holders affixed to the frame, and a pair of resilient inserts each bonded to an associated one of the mounting holders. Each insert has an opening and a pair of cylindrical mounting sleeves are tightly fitted into respective openings of these inserts such that the axes of the cylindrical mounting sleeves are aligned. Further included is a pair of spaced apart brackets of fixable to one end of one of the front and rear chassis portions. The brackets are of fixed to respective mounting sleeves and each has a circular aperture axially aligned with and of substantially the same diameter as the opening of an associated mounting sleeve. The spacing of the mounting holders and the brackets are such that one pair of the pairs of holders and brackets is interposed between the other of the pairs. The holders each snugly slidably receive a common support shaft. The resilient inserts are mounted such that they dampen the transmission of vibration from one of the chassis portions to the other.

When compared with the prior art, the present invention provides an articulator where there is no metal connection between the front and back vehicle portions. The resilient insert, of a material such as rubber, provides an effective means of isolating vibration and dampening oscillations between the front and rear vehicle portions. This articulator is extremely rugged, simple to produce and maintain and uses commonly available parts.

In drawings which illustrate embodiments of the invention:

FIG. 1 is a top plan view of the front and rear wheel portions of an articulated vehicle and the articulator interconnecting the vehicle portions;

FIG. 2 is a side elevational view, partly broken away, of the vehicle portions and articulator of FIG. 1; and FIG. 3 is an enlarged fragmentary view of the upper vertical articulator of FIGS. 1 and 2.

DESCRIPTION OF THE PREFERRED EMBODIMENTS

The drawings show an articulated vehicle 1 comprising a front wheeled chassis portion 2 with a pair of wheels 4 and 6 and a rear wheeled chassis portion 8 with a pair of wheels 10 and 12. While chassis portions 2 and 8 are designated as the front and rear portions respectively, the reverse designation would be appropriate for some applications of the vehicle 1. The drawings show only the lower part of the vehicle. For example the wheels 4 and 6 could be the drive wheels of the vehicle with the motor mounted on the top of front portion 2. In the same example, the operating cab for the vehicle would be mounted on the top of the rear portion 8, extending above the motor (not shown). Such vehicles could be employed with the Breaker Apparatus disclosed in U.S. Pat. No. 4,072,354 or could comprise the Utility Vehicle disclosed in Canadian Industrial Design No. 43,909 registered and available for public inspection on July 10, 1978. Other such vehicles are used as fork lifts and front end loaders where the articulation greatly increases the maneuverablity of the vehicle.

The front chassis portion 2 and the rear chassis portion 8 of the vehicle 1 are interconnected by an articulator 14. The articulator 14 includes an articulator frame 16 connected to the front chassis portion 2 of the vehicle 1. Articulator frame 16 comprises a pair of spaced-apart, vertically oriented plates 18 and 20 lying in planes parallel to the longitudinal axis of the rear chassis portion 8. Both plates 18 and 20 have a top side edge 22 and a bottom side edge 24. The plates are generally triangular with a vertical side edge 26, towards the front chassis portion 2 of the vehicle, a horizontal side edge 28 and a inclined side edge 30 which slopes downwardly towards the rear chassis portion 8 from the horizontal top side edge 22. The bottom side edge 24 is located on a rectangular downward projection 32 of each plate 18 and 20 adjacent the vertical side edge 26 of each plate. The rearward vertex of each said of the plates 18 and 20 is truncated by a vertical side edge 34. The plates 18 and 20 are interconnected near the top and bottom side edges 22 and 24, respectively, thereof by upper and lower horizontal connecting plates 36 and 38. Connecting plates 36 and 38 have semi-circular front edges 40 and 42 respectively.

A pair of spaced-apart horizontal clevis plates 44 and 46 extend rearwardly from front chassis portion 2 above and below the horizontal plate 36 of articulator frame 16. A similar pair of clevis plates 48 and 50 extend rearwardly from the chassis portion 2 above and below the horizontal connecting plate 38.

The articulator frame 16 is pivotally connected to the front chassis portion 2 for pivoting about the vertical axis 52 by means of upper vertical coupling 54 and lower vertical coupling 56. The vertical coupling 56 pivotally connects horizontal connecting plate 38 of articulator frame 16 to horizontal clevis plates 48 and 50 of front chassis portion 2 in the same manner as upper vertical coupling 54 pivotally connects clevis plates 44 and 46 to connecting plate 36. Vertical couplings 54 and 56 are identical. Referring to vertical coupling 54 as shown in FIG. 3, a bolt 58, provided with a spacer 60 and a nut 62, passes through apertures 64 and 66 in clevis plates 44 and 46 respectively and the larger aperture 68 in the horizontal connecting plate 36 of frame member 16. A bolt sleeve 70 is fitted over bolt 58 between clevis plates 44 and 46 and spacers 72 and 74 are located between the bolt sleeve 70 and clevis plates 44 and 46 respectively. A ball portion 76 of a self-aligned bearing is fitted over the bolt sleeve 70. A corresponding socket portion 78 of the self-aligned bearing is retained within aperture 68 of horizontal connecting plate 36 by means of split ring retainers 80 and 82 above and below the bearing. Retainer discs 80 and 82 are located within the circular slots 84 and 86 within aperture 68. The bearing portions 76 and 78 are capable of bearing the vertical forces acting along bolt 58 and the horizontal forces perpendicular thereto. Consequently, the vertical couplings 54 and 56 provide suitable bearings for all of the forces and moments encountered between the front chassis portion 2 and the rear chassis portion 8.

The articulator 14 also comprises a horizontal coupling assembly 87 which permits relative pivoting of the front chassis portion 2 and the rear chassis portion 8 of the vehicle 1 about a horizontal axis 94. The horizontal coupling assembly 87 comprises front horizontal coupling 88 and rear horizontal coupling 90. The vertical plates 18 and 20 of the frame member 16 are located to each side of the horizontal couplings 88 and 90. The horizontal couplings 88 and 90 are identical and share a common elongate coupling shaft 96 having a front end 100 and a rear end 98.

A flat base plate 102 is bolted to the rear chassis portion 8 by four bolts 104. The base plate 102 is generally rectangular. A pair of upstanding brackets 108 and 110 are welded to the base plate 102 and have circular apertures 112 and 114, respectively, for receiving the coupling shaft 96.

Each of the horizontal couplings 90 and 88 has a coupling pin connecting assembly 116 comprising a cylindrical mounting sleeve 118 and a portion of the coupling shaft 96 closely fitted within the cylindrical mounting sleeve 118.

The cylindrical mounting sleeve 118 of rear horizontal coupling 90 is welded on the rear face 120 of bracket 108 while the mounting sleeve 118 of coupling 88 is welded to the front face 122 of bracket 110. Bolts 124, each fitted with a washer 127 having a diameter greater than the diameter of the mounting sleeve 118, are threadedly received within a correspondingly tapped aperture 126 at both the rear end 98 and the front end 100 of the coupling shaft 96. The bolts 124 and washers 127 maintain the coupling shaft 96 in position within the cylindrical mounting sleeve 118 of each of the front and rear couplings 90 and 88.

An elongate, annular resilient insert 128, of a material such as rubber, is tightly received about and bonded to the mounting sleeve 118 of horizontal articulators 88 and 90. Each of the horizontal articulators 88 and 90 has a cylindrical insert enclosure30 tightly fitted about and bonded to the resilient insert 128, concentrically therewith. An outer mounting holder 134 extends closely about each insert enclosure sleeve 130 and is welded thereto. The mounting ring 134 of each of the horizontal couplings 88 and 90, in turn, is welded to the two vertical plates 18 and 20 of articulator frame 16.

Since the main mechanical connection between the front chassis portion 2 and the rear chassis portion 8 of the vehicle 1 is through the two resilient inserts 128, any vibration arising in one portion of the vehicle, for example caused by a motor mounted on the front chassis portion 2, is isolated from the other portion of the vehicle, for example a cab mounted on the rear chassis portion 8. Since all movement about axis 94 between the front and rear chassis portions is accommodated by deformation of inserts 128, oscillations occurring about this axis are dampened.

What I claim is:

1. An articulator for interconnecting front and rear chassis portions of a vehicle, comprising:
   (a) a frame;
   (b) a pair of spaced apart mounting holders affixed to said frame;
   (c) a pair of resilient inserts each bonded to an associated one of said mounting holders, said inserts each having an opening;
   (d) a pair of cylindrical mounting sleeves tightly fitted into respective openings of said inserts such that the axes of said cylinders are aligned; and
   (e) a pair of spaced apart brackets affixable to one end of one of said front and rear chassis portions, said brackets affixed to respective mounting sleeves and each bracket having a circular aperture axially aligned with and of substantially the same diameter as the opening of an associated mounting sleeve,
   the spacing of said mounting holders and said brackets being such that one pair of said pairs of holders and brackets is interposed between the other of said pairs and said holders and brackets each snugly slidably receive a common coupling shaft and whereby said resilient insert dampens the transmission of vibration from one of said chassis portions to the other.

2. The articulator defined in claim 1, wherein said mounting holders each include an insert enclosure the interior surface of which is tightly fitted around said resilient insert.

3. The articulator defined in claim 2 wherein said insert enclosures and said mounting sleeves are bonded to said respective associated resilient inserts.

4. An articulator as defined in claim 3 further comprising a vertical coupling assembly affixed to said frame and couplable to the other of said front and rear chassis portions for permitting pivoting of said other of said front and rear chassis portions about a substantially vertical axis perpendicular to the axis of said cylindrical mounting sleeves.

5. An articulator as defined in claim 4, wherein said pair of brackets are interposed between said pair of mounting holders.

6. The articulator defined in claim 5, wherein said one of said front and rear chassis portions is said rear chassis portion.

7. The articulator defined in claim 5, wherein said resilient insert is rubber.

8. The articulator as defined in claim 3, further comprising a vertical coupling including bearing means for pivotally connecting said frame to the other of said front and rear chassis portions for pivoting about a generally vertical axis and permitting relative pivoting of the two chassis portions, about said generally vertical axis.

9. An articulator as defined in claim 8, wherein said bearing means includes a first bearing and a second bearing axially aligned with said first bearing along an axis substantially perpendicular to the axis of said cylindrical knotting sleeves at opposed ends of said frame such that said bearings pivotally connect the frame to said other vehicle portion.

10. The articulator as defined in claim 8 wherein said bearings are self aligned bearings.

11. An articulator as defined in claim 9, wherein the frame member includes a pair of spaced apart vertically oriented plates, said plates being located on opposite sides of said frame in planes parallel to the axis defined by said mounting sleeves.

12. An articulator for interconnecting front and rear chassis portions of a vehicle, comprising:
(a) a frame,
(b) a pair of spaced apart mounting holders affixed to said frame;
(c) a pair of insert enclosures each affixed to an associated one of said mounting holders;
(d) a pair of resilient inserts each bonded to an interior surface of an associated one of said insert enclosures;
(e) a pair of cylindrical mounting sleeves each fitted into an opening in and bonded to an associated one of said resilient inserts and such that the interior bores of said sleeves are axially aligned;
(f) a pair of spaced apart brackets affixable to one end of one of said front and rear chassis portions, said brackets having circular apertures of substantially the same diameter, as the diameter of said bores and when said brackets are affixed to said one chassis portion, they are axially aligned along a longitudinal axis of said one chassis portion, the spacing of said mounting holders and said brackets being such that said holders and said brackets are alignable along a common axis with one pair of said pair of holders and brackets interposed between the other of said pairs;
(g) a coupling shaft snugly, slidably receivable by said respective bores and apertures for providing support to said mounting holders and said brackets;
(h) means for releasably retaining said coupling shaft in position in said bores and apertures,
whereby said resilient insert dampens the transmission of vibrations from one of said chassis portions to the other.

13. The articulator defined in claim 12, wherein an exterior surface of each said mounting sleeve is bonded to an interior surface of an associated one of said inserts.

14. The articulator defined in claim 13, wherein one end of each mounting sleeve is affixed to an adjacent face of an associated one of said mounting brackets.

15. The articulator defined in claim 14, further comprising a vertical coupling assembly affixed to said frame and coupable to the other of said front and rear chassis portions permitting pivoting of said other of said front and rear chassis portions about a substantially vertical axis perpendicular to the axis of said bores.

16. The articulator defined in claim 15, wherein an exterior surface of each said mounting sleeve is bonded to an interior surface and an associated one of said inserts.

* * * * *